United States Patent
Suciu et al.

(10) Patent No.: US 10,823,070 B2
(45) Date of Patent: Nov. 3, 2020

(54) INTERCOOLED COOLING AIR SYSTEM WITH BYPASS

(71) Applicant: United Technologies Corporation, Farmington, CT (US)

(72) Inventors: Gabriel L. Suciu, Glastonbury, CT (US); William K. Ackermann, East Hartford, CT (US); Brian Merry, Andover, CT (US); Neil Terwilliger, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 402 days.

(21) Appl. No.: 15/410,971

(22) Filed: Jan. 20, 2017

(65) Prior Publication Data
US 2018/0209343 A1 Jul. 26, 2018

(51) Int. Cl.
*F02C 7/18* (2006.01)
*F02C 3/04* (2006.01)
*F02K 3/06* (2006.01)

(52) U.S. Cl.
CPC ............ *F02C 7/185* (2013.01); *F02C 3/04* (2013.01); *F02K 3/06* (2013.01); *F05D 2260/213* (2013.01); *Y02T 50/676* (2013.01)

(58) Field of Classification Search
CPC .... F02C 7/18; F02C 7/185; F02C 3/04; F02C 9/18; F05D 2260/213; D02K 3/06; Y02T 50/676
See application file for complete search history.

(56) References Cited

U.S. PATENT DOCUMENTS

| | | | |
|---|---|---|---|
| 5,392,614 A * | 2/1995 | Coffinberry | F02C 7/12 60/806 |
| 2016/0237901 A1 | 8/2016 | Zelesky et al. | |
| 2016/0237909 A1* | 8/2016 | Snape | F02C 6/08 |

FOREIGN PATENT DOCUMENTS

| EP | 0608142 A1 | 7/1994 |
|---|---|---|
| EP | 3056714 A1 | 2/2016 |

OTHER PUBLICATIONS

European Search Report Issued in EP Application No. 18152624.5, dated Jun. 7, 2018, 7 Pages.

\* cited by examiner

*Primary Examiner* — Craig Kim
(74) *Attorney, Agent, or Firm* — Cantor Colburn LLP

(57) ABSTRACT

An intercooled cooling system for a gas turbine engine includes a heat exchanger in fluid communication with a cooling airflow source directed through the heat exchanger and an auxiliary compressor fluidly coupled to the heat exchanger via a discharge duct to compress the cooling airflow exiting the heat exchanger. A compressor discharge pathway directs a first portion of the cooling airflow from the auxiliary compressor to a first cooling location of the gas turbine engine, and a bypass pathway is fluidly coupled to the discharge duct between the heat exchanger and the auxiliary compressor to direct a second portion of the cooling airflow to a second cooling location of the gas turbine without passing through the auxiliary compressor.

17 Claims, 2 Drawing Sheets

INTERCOOLED COOLING AIR SYSTEM WITH BYPASS

BACKGROUND

This present disclosure relates to a gas turbine engine, and more particularly to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

In a gas turbine engine, cooling air is often provided from the compressor to the turbine section to reduce component temperature in the turbine section and improve overall gas turbine engine operation. In some gas turbine engines, air from the high compressor discharge is passed through a heat exchanger, which may be located in a fan bypass duct and then delivered into the turbine section as cooling air. The air from the downstream most end of the compressor section is at elevated temperatures, relative to air at other portions of the compressor section.

Running the operating temperatures in the turbine section at high temperatures provides efficiency gains in the gas turbine engine; however, the high temperatures are exceeding material limits and are driving the need for improved cooling air. That is, conventional cooling air methods often require large amounts of airflow to provide cooling air at sufficient pressure to be introduced to the highest pressure places of the gas turbine engine and at cool enough temperature to reduce key component temperatures.

BRIEF SUMMARY

In one embodiment, an intercooled cooling system for a gas turbine engine includes a heat exchanger in fluid communication with a cooling airflow source directed through the heat exchanger and an auxiliary compressor fluidly coupled to the heat exchanger via a discharge duct to compress the cooling airflow exiting the heat exchanger. A compressor discharge pathway directs a first portion of the cooling airflow from the auxiliary compressor to a first cooling location of the gas turbine engine, and a bypass pathway is fluidly coupled to the discharge duct between the heat exchanger and the auxiliary compressor to direct a second portion of the cooling airflow to a second cooling location of the gas turbine without passing through the auxiliary compressor.

Additionally or alternatively, in this or other embodiments a bypass valve regulates flow of the compressor bypass airflow through the bypass pathway.

Additionally or alternatively, in this or other embodiments the cooling air source is a compressor bleed port of the gas turbine engine.

Additionally or alternatively, in this or other embodiments the heat exchanger is configured such that the heat exchanger cools the cooling airflow via a thermal energy exchange with a fan bypass airflow of the gas turbine engine.

Additionally or alternatively, in this or other embodiments the heat exchanger is multi-pass heat exchanger.

Additionally or alternatively, in this or other embodiments a first temperature of the first portion of the cooling airflow is greater than a second temperature of the compressor bypass airflow and/or a first pressure of the first portion of the cooling airflow is greater than a second pressure of the compressor bypass airflow.

Additionally or alternatively, in this or other embodiments the first cooling location is one of a high pressure turbine blade, a high pressure turbine disk or a high pressure turbine vane.

Additionally or alternatively, in this or other embodiments the second cooling location is one of a second vane or blade of a high pressure turbine or a component in a low pressure turbine of the gas turbine engine.

In another embodiment, a gas turbine engine includes a compressor section, a combustor section, a turbine section, and an intercooled cooling system for a gas turbine engine. The intercooled cooling system includes a heat exchanger in fluid communication with a cooling airflow source directed through the heat exchanger and an auxiliary compressor fluidly coupled to the heat exchanger via a discharge duct to compress the cooling airflow exiting the heat exchanger. A compressor discharge pathway directs a first portion of the cooling airflow from the auxiliary compressor to a first cooling location of the gas turbine engine and a bypass pathway is fluidly coupled to the discharge duct between the heat exchanger and the auxiliary compressor to direct a second portion of the cooling airflow as a compressor bypass airflow to a second cooling location of the gas turbine without passing through the auxiliary compressor.

Additionally or alternatively, in this or other embodiments a bypass valve regulates flow of the compressor bypass airflow through the bypass pathway.

Additionally or alternatively, in this or other embodiments the cooling air source is a compressor bleed port of the compressor section.

Additionally or alternatively, in this or other embodiments the heat exchanger is configured such that the heat exchanger cools the cooling airflow via a thermal energy exchange with a fan bypass airflow of the gas turbine engine.

Additionally or alternatively, in this or other embodiments the heat exchanger is multi-pass heat exchanger.

Additionally or alternatively, in this or other embodiments the auxiliary compressor includes at least one impeller.

Additionally or alternatively, in this or other embodiments a first temperature of the first portion of the cooling airflow is greater than a second temperature of the compressor bypass airflow.

Additionally or alternatively, in this or other embodiments a first pressure of the first portion of the cooling airflow is greater than a second pressure of the compressor bypass airflow.

In yet another embodiment, a method of providing cooling air to gas turbine engine locations includes directing a cooling airflow from a cooling airflow source to a heat exchanger, reducing a temperature of the cooling airflow at the heat exchanger, flowing the cooling airflow along a discharge duct from the heat exchanger toward an auxiliary compressor, flowing a first portion of the cooling airflow through the auxiliary compressor and toward a first cooling location of the gas turbine engine along a compressor discharge pathway, flowing a second portion of the cooling airflow through a compressor bypass pathway extending from the discharge duct between the heat exchanger and the auxiliary compressor, thereby bypassing the auxiliary compressor, and directing the second portion of the cooling airflow toward a second cooling location of the gas turbine engine.

Additionally or alternatively, in this or other embodiments the flow of the second portion of the cooling airflow is regulated via operation of a bypass valve.

Additionally or alternatively, in this or other embodiments the temperature of the cooling airflow is reduced via a thermal energy exchange with a fan bypass airflow of the gas turbine engine.

Additionally or alternatively, in this or other embodiments the cooling airflow source is a compressor bleed port of the gas turbine engine.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
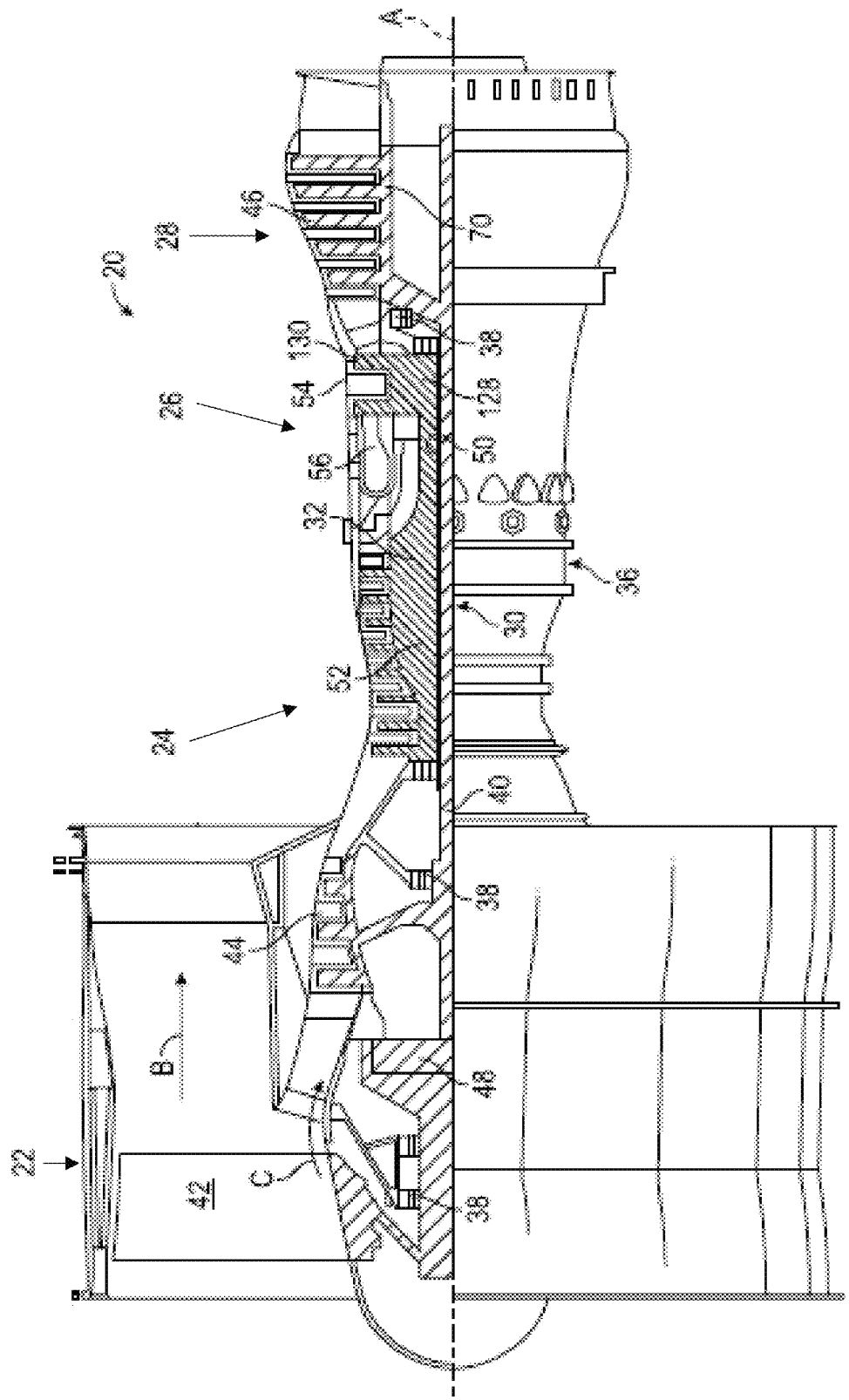
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a fan bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46.

The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the fan bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft./sec divided by an industry standard temperature correction of $[(Tram\ °R)/(518.7°\ R)]^{0.5}$. The "Low corrected fan tip speed" as disclosed herein according to one non-limiting embodiment is less than about 1150 ft./second (350.5 m/sec).

Figure 2:
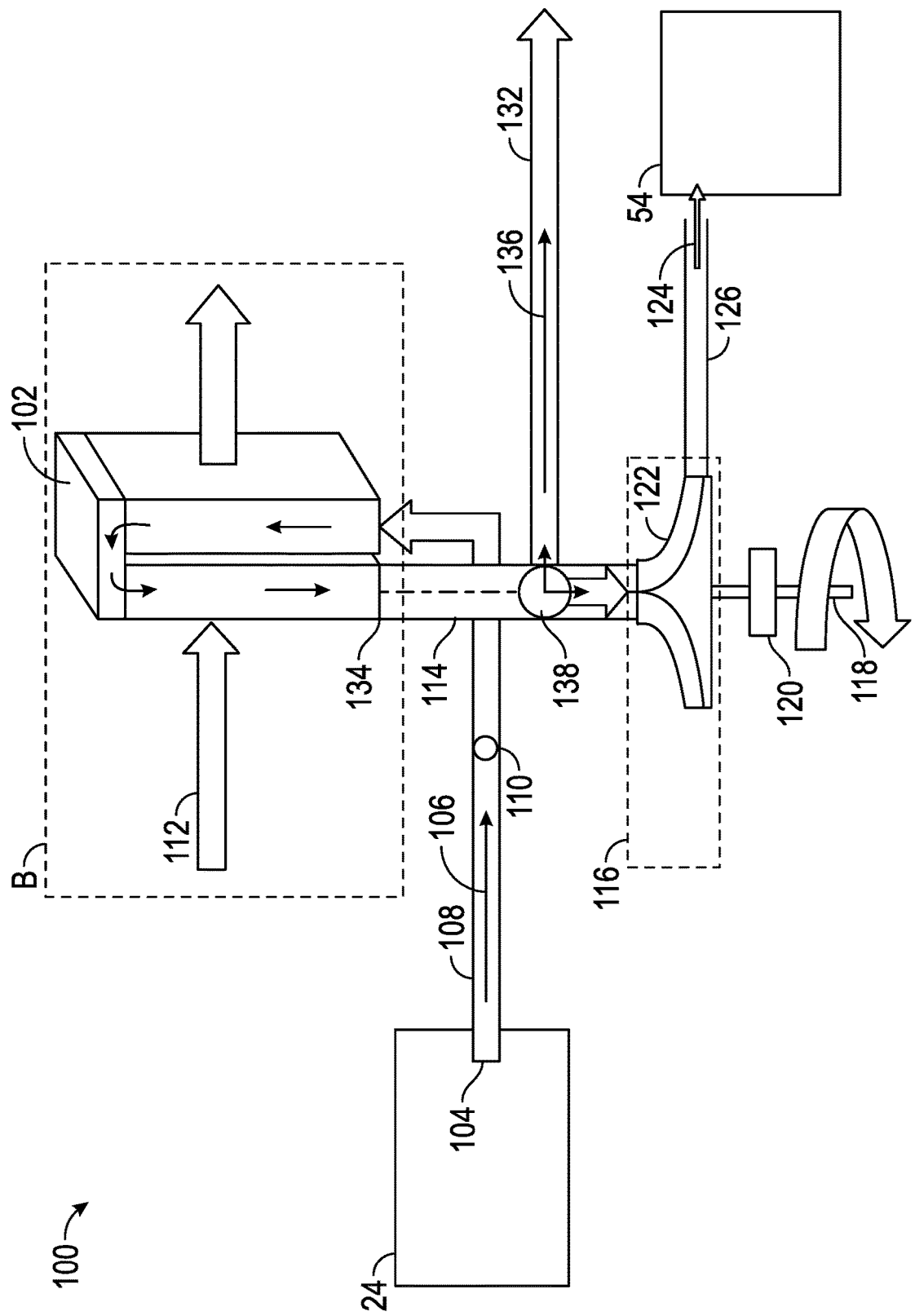
FIG. 2 is a schematic illustration of an embodiment of an intercooled cooling air system.

Turning now to FIG. 2, an embodiment of an intercooled cooling air (ICCA) system 100 is illustrated. The ICCA system includes a heat exchanger 102 connected to the compressor section 24 of the gas turbine engine 20. The ICCA system 100 is connected to, for example, a bleed port 104 of the compressor section 24 such that a bleed airflow 106 is directed from the compressor section 24 to the heat exchanger 102 via through the bleed port 104 and a bleed duct 108. In some embodiments, the bleed airflow 106 through the bleed port 104 and bleed duct 108 is controlled by one or more bleed valves 110 located, for example, along the bleed duct 108 between the bleed port 104 and the heat exchanger 102. In some embodiments, the bleed port 104 is located at the high pressure compressor 52, such that the bleed airflow 106 is extracted from the core flowpath C at the high pressure compressor 52. In some embodiments, the bleed port 104 is located at a sixth compressor stage of the high pressure compressor 52.

The heat exchanger 102 is configured and oriented such that a bypass airflow 112 through fan bypass flowpath B is utilized to cool the bleed airflow 106 via thermal energy exchange at the heat exchanger 102. In some embodiments, the heat exchanger 102 is located at least partially in the fan bypass flowpath B. Fan bypass airflow 112 flowing across the heat exchanger 102 cools the bleed airflow 106 at the heat exchanger 102, is discharged from the heat exchanger 102 and continues along bypass flowpath B. In some embodiments, such as shown in FIG. 2, the heat exchanger 102 is a multi-pass heat exchanger 102, in which the bleed airflow 106 flows across the fan bypass airflow 112 multiple times to increase the cooling effects thereof. While in the embodiment of FIG. 2, a multi-pass heat exchanger 102 is utilized, one skilled in the art will appreciated that other arrangements of heat exchangers 102, for example, multiple heat exchangers 102 arranged serially or in parallel, may be utilized.

Bleed airflow 106 is discharged from the heat exchanger 102 along a discharge duct 114 toward an auxiliary compressor 116. The auxiliary compressor 116 is driven by, for example, a tower shaft 118 of the gas turbine engine 20. In some embodiments, an auxiliary gear box 120 may connect the tower shaft 118 and the auxiliary compressor 116 such that the auxiliary compressor 116 is driven at a selected rotational speed. In some embodiments, the auxiliary compressor 116 includes an impeller 122, but it is to be appreciated that auxiliary compressors 116 having other types of rotating structures, for example, screws or the like, may be utilized. In some embodiments, the impeller 122 is formed from a metal such as nickel or titanium or allows thereof.

Discharge flow 124 from the auxiliary compressor 116, at an increased temperature and pressure compared to the bleed airflow 106 entering the auxiliary compressor 116, is directed along a compressor discharge pathway 126 to components of the turbine section 28, for example, a high pressure turbine 54 to cool components of the high pressure turbine 54. In some embodiments, the discharge airflow 124 is utilized to provide cooling of a high pressure turbine disk 128 and/or high pressure turbine blades 130 and/or high pressure turbine vanes (shown in FIG. 1).

The auxiliary compressor 116 is configured to provide discharge airflow 124 at a pressure compatible with a working fluid pressure at a selected discharge location of the high pressure turbine 54, for example, at a first blade or first vane of the high pressure turbine 54. In some cases, however, the discharge airflow 124 compressed at the auxiliary compressor 116 is compressed to a higher pressure than is required at the selected discharge location and may result in a performance loss.

To provide cooling airflow suitable for use fluidly downstream of the selected discharge location, a compressor bypass pathway 132 is fluidly connected to the discharge duct 114 between a heat exchanger outlet 134 and the auxiliary compressor 116. A selected portion of the bleed airflow 106 is directed along the compressor bypass pathway 132 as compressor bypass airflow 136, bypassing the auxiliary compressor 116. As a result, the compressor bypass airflow 136 has a lower pressure and temperature than the discharge airflow 124 flowing along the compressor discharge pathway 126, and is suitable for use as cooling airflow for selected cooling locations with significantly lower operating pressure than the discharge location of compressor discharge pathway 126. The selected cooling locations of the compressor bypass airflow 136 may include, for example, high pressure turbine 54 components, or low pressure turbine 46 or high pressure compressor 52 components.

A bypass ratio of compressor bypass airflow 136 to discharge airflow 124 may be fixed, or in some embodiments may be variable. Variability in bypass ratio may be provided by, for example, a bypass valve 138 located at, for example, an intersection of the discharge duct 114 and the compressor bypass pathway 132. Operation of the bypass valve 138 thus varies the bypass ratio by regulating flow of the bleed airflow 106 through the discharge duct 114 and/or the compressor bypass pathway 132.

By providing cooler and lower pressure compressor bypass airflow 136, total cooling airflow can be reduced, and inclusion of the bypass pathway 132 in the ICCA system 100 improves versatility and efficiency of the ICCA system 100. and the compressor bypass airflow 136 expands gas turbine engine locations to which the ICCA system 100 may provide cooling airflow, while require less work to be input into the ICCA system 100, thus improving fuel burn of the gas turbine engine 20. Further, the improved cooling may extend service life of the components While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An intercooled cooling system for a gas turbine engine, comprising:
a heat exchanger in fluid communication with a cooling airflow source directed through the heat exchanger;
an auxiliary compressor fluidly coupled to the heat exchanger via a discharge duct to compress the cooling airflow exiting the heat exchanger;
a compressor discharge pathway to direct a first portion of the cooling airflow from the auxiliary compressor to a first cooling location of the gas turbine engine;
a bypass pathway fluidly coupled to the discharge duct between the heat exchanger and the auxiliary compressor to direct a second portion of the cooling airflow directly from the discharge duct to a second cooling location of the gas turbine without passing through the auxiliary compressor; and
a bypass valve disposed between the heat exchanger and the auxiliary compressor, the bypass valve configured regulate flow of the compressor bypass airflow exiting the heat exchanger to control a bypass ratio of the second portion of the cooling airflow to the first portion of the cooling airflow;

wherein the first cooling location and the second cooling location are disposed at one of high speed spool or a low speed spool of the gas turbine engine.

2. The intercooled cooling system of claim 1, wherein the cooling air source is a compressor bleed port of the gas turbine engine.

3. The intercooled cooling system of claim 1, wherein the heat exchanger is configured such that the heat exchanger cools the cooling airflow via a thermal energy exchange with a fan bypass airflow of the gas turbine engine.

4. The intercooled cooling system of claim 1, wherein the heat exchanger is multi-pass heat exchanger.

5. The intercooled cooling system of claim 1, wherein a first temperature of the first portion of the cooling airflow is greater than a second temperature of the compressor bypass airflow and/or a first pressure of the first portion of the cooling airflow is greater than a second pressure of the compressor bypass airflow.

6. The intercooled cooling system of claim 1, wherein the first cooling location is one of a high pressure turbine blade, a high pressure turbine disk or a high pressure turbine vane.

7. The intercooled cooling system of claim 1, wherein the second cooling location is one of a second vane or blade of a high pressure turbine or a component in a low pressure turbine of the gas turbine engine.

8. A gas turbine engine, comprising:
a compressor section;
a combustor section;
a turbine section; and
an intercooled cooling system for a gas turbine engine, the intercooled cooling system including:
a heat exchanger in fluid communication with a cooling airflow source directed through the heat exchanger;
an auxiliary compressor fluidly coupled to the heat exchanger via a discharge duct to compress the cooling airflow exiting the heat exchanger;
a compressor discharge pathway to direct a first portion of the cooling airflow from the auxiliary compressor to a first cooling location of the gas turbine engine;
a bypass pathway fluidly coupled to the discharge duct between the heat exchanger and the auxiliary compressor to direct a second portion of the cooling airflow as a compressor bypass airflow directly from the discharge duct to a second cooling location of the gas turbine without passing through the auxiliary compressor; and
a bypass valve disposed between the heat exchanger and the auxiliary compressor, the bypass valve configured regulate flow of the compressor bypass airflow exiting the heat exchanger to control a bypass ratio of the second portion of the cooling airflow to the first portion of the cooling airflow;
wherein the first cooling location and the second cooling location are disposed at one of high speed spool or a low speed spool of the gas turbine engine.

9. The gas turbine engine of claim 8, wherein the cooling air source is a compressor bleed port of the compressor section.

10. The gas turbine engine of claim 8, wherein the heat exchanger is configured such that the heat exchanger cools the cooling airflow via a thermal energy exchange with a fan bypass airflow of the gas turbine engine.

11. The gas turbine engine of claim 8, wherein the heat exchanger is multi-pass heat exchanger.

12. The gas turbine engine of claim 8, wherein the auxiliary compressor includes at least one impeller driven by a tower shaft of the gas turbine engine.

13. The gas turbine engine of claim 8, wherein a first temperature of the first portion of the cooling airflow is greater than a second temperature of the compressor bypass airflow.

14. The gas turbine engine of claim 8, wherein a first pressure of the first portion of the cooling airflow is greater than a second pressure of the compressor bypass airflow.

15. A method of providing cooling air to gas turbine engine locations, comprising:
directing a cooling airflow from a cooling airflow source to a heat exchanger;
reducing a temperature of the cooling airflow at the heat exchanger;
flowing the cooling airflow along a discharge duct from the heat exchanger toward an auxiliary compressor;
flowing a first portion of the cooling airflow through the auxiliary compressor and toward a first cooling location of the gas turbine engine along a compressor discharge pathway;
flowing a second portion of the cooling airflow through a compressor bypass pathway extending from the discharge duct between the heat exchanger and the auxiliary compressor, thereby bypassing the auxiliary compressor;
directing the second portion of the cooling airflow directly from the discharge duct to a second cooling location of the gas turbine engine via the compressor bypass pathway; and
regulating flow of the compressor bypass airflow exiting the heat exchanger to control a bypass ratio of the second portion of the cooling airflow to the first portion of the cooling airflow via a bypass valve disposed between the heat exchanger and the auxiliary compressor;
wherein the first cooling location and the second cooling location are disposed at one of high speed spool or a low speed spool of the gas turbine engine.

16. The method of claim 15, further comprising reducing the temperature of the cooling airflow via a thermal energy exchange with a fan bypass airflow of the gas turbine engine.

17. The method of claim 15, wherein the cooling airflow source is a compressor bleed port of the gas turbine engine.

* * * * *